(12) United States Patent
Kona et al.

(10) Patent No.: US 11,392,438 B2
(45) Date of Patent: Jul. 19, 2022

(54) RESPONDING TO UNRESPONSIVE PROCESSING CIRCUITRY

(71) Applicant: ARM Limited, Cambridge (GB)

(72) Inventors: Anitha Kona, Austin, TX (US); Michael Wayne Garner, Pinehurst, TX (US); Randall L. Jones, Austin, TX (US); Tessil Thomas, Cambridge (GB); Seow Chuan Lim, Letchworth Garden City (GB); Karthick Santhanam, Austin, TX (US); Liana Christine Nicklaus, Austin, TX (US)

(73) Assignee: Arm Limited, Cambridge (GB)

( * ) Notice: Subject to any disclaimer, the term of this patent is extended or adjusted under 35 U.S.C. 154(b) by 312 days.

(21) Appl. No.: 15/428,550

(22) Filed: Feb. 9, 2017

(65) Prior Publication Data

US 2018/0225168 A1 Aug. 9, 2018

(51) Int. Cl.
G06F 11/07 (2006.01)
G06F 13/24 (2006.01)

(52) U.S. Cl.
CPC ...... *G06F 11/0757* (2013.01); *G06F 11/0772* (2013.01); *G06F 13/24* (2013.01)

(58) Field of Classification Search
CPC .............................. G06F 11/0757; G06F 13/24
See application file for complete search history.

(56) References Cited

U.S. PATENT DOCUMENTS

| | | | | | |
|---|---|---|---|---|---|
| 4,703,419 A | * | 10/1987 | Krause | .................... | G06F 15/17 710/266 |
| 2004/0193763 A1 | * | 9/2004 | Iizuka | .................. | G06F 13/385 710/52 |
| 2009/0235099 A1 | * | 9/2009 | Branover | .............. | G06F 1/3203 713/322 |
| 2010/0235558 A1 | * | 9/2010 | Snead | ................. | G06F 11/0724 710/267 |
| 2015/0370665 A1 | * | 12/2015 | Cannata | .............. | G06F 11/2012 714/4.11 |
| 2016/0019062 A1 | * | 1/2016 | Yasin | .................. | G06F 9/30036 712/226 |
| 2017/0351516 A1 | * | 12/2017 | Mekkat | ................. | G06F 9/3851 |

\* cited by examiner

*Primary Examiner* — Henry Tsai
*Assistant Examiner* — John B Roche
(74) *Attorney, Agent, or Firm* — Nixon & Vanderhye P.C.

(57) ABSTRACT

A data processing apparatus is provided comprising first processing circuitry. Interrupt generating circuitry generates an outgoing interrupt in response to the first processing circuitry becoming unresponsive. Interrupt receiving circuitry receives an incoming interrupt, which indicates that second processing circuitry has become unresponsive, and in response to receiving the incoming interrupt, causes the data processing apparatus to access data managed by the second processing circuitry.

11 Claims, 6 Drawing Sheets

RESPONDING TO UNRESPONSIVE PROCESSING CIRCUITRY

TECHNICAL FIELD

The present disclosure relates to data processing. In particular, the present disclosure has relevance to responding to unresponsive processing circuitry.

DESCRIPTION

In a data processing apparatus, processing circuitry may become unresponsive. For example, a watchdog timer can be configured such that if the timer fires, the processing circuitry is deemed to be unresponsive. Meanwhile, the processing circuitry can be configured to reset the watchdog timer every period of time smaller than the expiry time of the watchdog timer. In other words, the timer will fire if the processing circuitry becomes unable to reset the timer, at which point it could be concluded that the processing circuitry is unresponsive. The firing of the timer can cause an interrupt, which can be routed in order to cause the processing circuitry to be reset. In such situations, it is desirable to determine why the processing circuitry became unresponsive. One way to achieve this is by performing trace, i.e. by outputting the result of transactions carried out by the processing circuitry. However, this can result in outputting a large amount of data that must be examined. Indeed, there exists a trade-off between outputting sufficient data to perform a diagnosis and not outputting so much data that the task becomes too complicated due to the amount of data to be examined. Furthermore, sometimes it is not the transactions themselves that are of interest per se, but rather than actual data being operating on by the processing circuitry. Of course, once the processing circuitry has become unresponsive, it may be too late to start recording transactions, since the event that caused the processing circuitry to become unresponsive has already occurred. In some other situations, security concerns mean that data being managed by an unresponsive processing circuitry should be secured against being accessed by another device. It would therefore be desirable to overcome some or all of these limitations.

SUMMARY

Viewed from a first example configuration, there is provided a data processing apparatus comprising: first processing circuitry; interrupt generating circuitry configured to generate an outgoing interrupt in response to said first processing circuitry becoming unresponsive; and interrupt receiving circuitry configured to receive an incoming interrupt, which indicates that second processing circuitry has become unresponsive, and in response to receiving said incoming interrupt, to cause said data processing apparatus to access data managed by said second processing circuitry.

Viewed from a second example configuration, there is provided a data processing method comprising: processing one or more instructions; generating an outgoing interrupt in response to first processing circuitry becoming unresponsive; receiving an incoming interrupt, which indicates that second processing circuitry has become unresponsive; and causing said data processing apparatus, in response to receiving said incoming interrupt, to access data managed by said second processing circuitry.

Viewed from a third example configuration, there is provided a data processing system comprising: a plurality of data processing apparatuses, each comprising: first processing circuitry; interrupt generating circuitry configured to generate an outgoing interrupt in response to said first processing circuitry becoming unresponsive; and interrupt receiving circuitry configured to receive an incoming interrupt, which indicates that second processing circuitry on an other one of said plurality of data processing apparatuses has become unresponsive, and in response to receiving said incoming interrupt, to cause said data processing apparatus to access data managed by said other one of said plurality of data processing apparatuses.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: first processing circuitry; interrupt generating circuitry configured to generate an outgoing interrupt in response to said first processing circuitry becoming unresponsive; and interrupt receiving circuitry configured to receive an incoming interrupt, which indicates that second processing circuitry has become unresponsive, and in response to receiving said incoming interrupt, to cause said data processing apparatus to access data managed by said second processing circuitry.

Rather than an interrupt that signals a lack of response from the processing circuitry immediately being used to reset that processing circuitry, the interrupt is generated and routed to handler processing circuitry. Meanwhile, the data processing apparatus is configured to receive an interrupt in relation to the unresponsiveness of other processing circuitry. In response to that interrupt, the data processing apparatus is made to access data managed by the other processing circuitry. In this way, when processing circuitry becomes unresponsive, the interrupt is routed such that it is possible for another device to access the data managed by that processing circuitry. Similarly, when other processing circuitry becomes unresponsive, an interrupt indicating that fact is routed so that the data processing apparatus can be made to access data managed by that other processing circuitry.

In some embodiments, said data managed by said second processing circuitry comprises a state of said second processing circuitry. Such state could be an architectural state of the system including values used for the current operation of the data processing apparatus or system. For example, the state information could include values held in registers, memory or other forms of data storage within the apparatus or system. By accessing such data, it is possible to determine what the data processing apparatus was doing that caused the interrupt to occur, which can be useful in debugging the operation of the data processing apparatus. In some cases, it may even be possible to resume some of the operations in which the data processing apparatus was engaged before the interrupt occurred.

In some embodiments, said interrupt receiving circuitry is configured to cause said data processing apparatus to access said data managed by said second processing circuitry by copying said data managed by said second processing circuitry to produce copied data. By copying the data managed by the second processing circuitry, the data need not be lost when the second processing circuitry is reset. The data can then be analysed by analysis circuitry or restored as desired.

In some embodiments, said interrupt receiving circuitry is configured to make said copied data available to third processing circuitry. The third processing circuitry could, for example, provide analysis circuitry that is able to perform analysis of the state of the data processing apparatus as the interrupt occurred. In this way, it can be possible to determine what caused the interrupt to occur. In some embodiments, the third processing circuitry could resume execution. For example, if the interrupt occurred as a consequence of an unlikely event occurring then there may be no harm in simply continuing execution on a different processing circuitry.

In some embodiments, said interrupt receiving circuitry is configured to cause said data processing apparatus to access said data by overwriting said data managed by said second processing circuitry. In such embodiments, security may be of high importance. For example, the data being managed relate to private information that should not be freely accessed or data that has been temporarily stored in a decrypted format. In order to prevent such data from being accessed in an undesirable manner, the data can be overwritten either with random data or with predetermined data, or alternatively the data can simply be erased so that it can no longer be accessed.

In some embodiments, in response to receiving said incoming interrupt, said interrupt receiving circuitry is further configured, after said data processing apparatus has accessed said data managed by said second processing circuitry, to cause said second processing circuitry to be reset. Once the second processing circuitry has been reset, the state of that second processing circuitry will generally be lost. However, the second processing circuitry can then be used to perform new tasks. In other words, the reset of the second processing circuitry is an example of a corrective action that makes it possible for the system to resume operating (albeit with the state having been lost). In some embodiments, the second processing circuitry could be restored to a previously "safe" state in order to attempt execution again.

In some embodiments, said interrupt generating circuitry is configured to determine that said first processing circuitry has become unresponsive by expiration of a watchdog timer. A watchdog timer is a timer that is set to fire after a period of time. When the timer fires, an associated interrupt is generated (e.g. the outgoing interrupt previously described). This can, for example, be used to cause the system to be reset. A process within the system continually resets the watchdog timer. Consequently, as long as the system remains responsive, the watchdog timer will not fire. If the system becomes unresponsive the process that causes the watchdog timer to be reset does not run and consequently, the watchdog timer fires, causing some action (such as a system reset) to occur.

In some embodiments, in response to said interrupt receiving circuitry receiving said incoming interrupt and said first processing circuitry becoming unresponsive, said data processing apparatus is configured to cause said first processing circuitry and said second processing circuitry to be reset. Such embodiments recognise the situation in which, in handling an interrupt that indicates that circuitry has become unresponsive, the handler itself might be or might become unresponsive itself. In this case, if the circuitry that would handle a lack of response is itself unresponsive, then it is necessary to take action. In these embodiments, the action taken is to cause both the first processing circuitry and the second processing circuitry to be reset. In some other embodiments, there is provided fourth processing circuitry that accesses data managed by the first processing circuitry and by the second processing circuitry. In general, there may be N processing circuits, each of which is configured to access data managed by any other processing circuitry (singular or plural) that becomes unresponsive in response to an interrupt indicating the processing circuitry that has become unresponsive.

In some embodiments, said interrupt generating circuitry is configured to route said outgoing interrupt to handler processing circuitry; and said handler processing circuitry comprises or is comprised by said second processing circuitry. Consequently, the data processing apparatus both responds to an incoming interrupt for second processing circuitry and directs its own outgoing interrupt to the second processing circuitry. The handler processing circuitry could be the second processing circuitry, could contain the second processing circuitry, or could be part of the second processing circuitry.

The data processing device could take a number of forms. However, in some embodiments, said interrupt generating circuitry is configured to route said outgoing interrupt to handler processing circuitry; said data processing apparatus is a system control processor; and said handler processing circuitry is a manageability control processor. In other embodiments, said interrupt generating circuitry is configured to route said outgoing interrupt to handler processing circuitry; said data processing apparatus is a manageability control processor; and said handler processing circuitry is a system control processor. For example, each of the manageability control processor and the system control processor could be elements of the same System-on-Chip (SoC).

Although in some embodiments, the handler processing circuitry and the processing circuitry are the same, in some embodiments, said interrupt generating circuitry is configured to route said outgoing interrupt to handler processing circuitry; and said handler processing circuitry is different to said first processing circuitry. For example, the two circuitries could be distinct elements within the same device.

Particular embodiments will now be described with reference to the figures.

Figure 1:
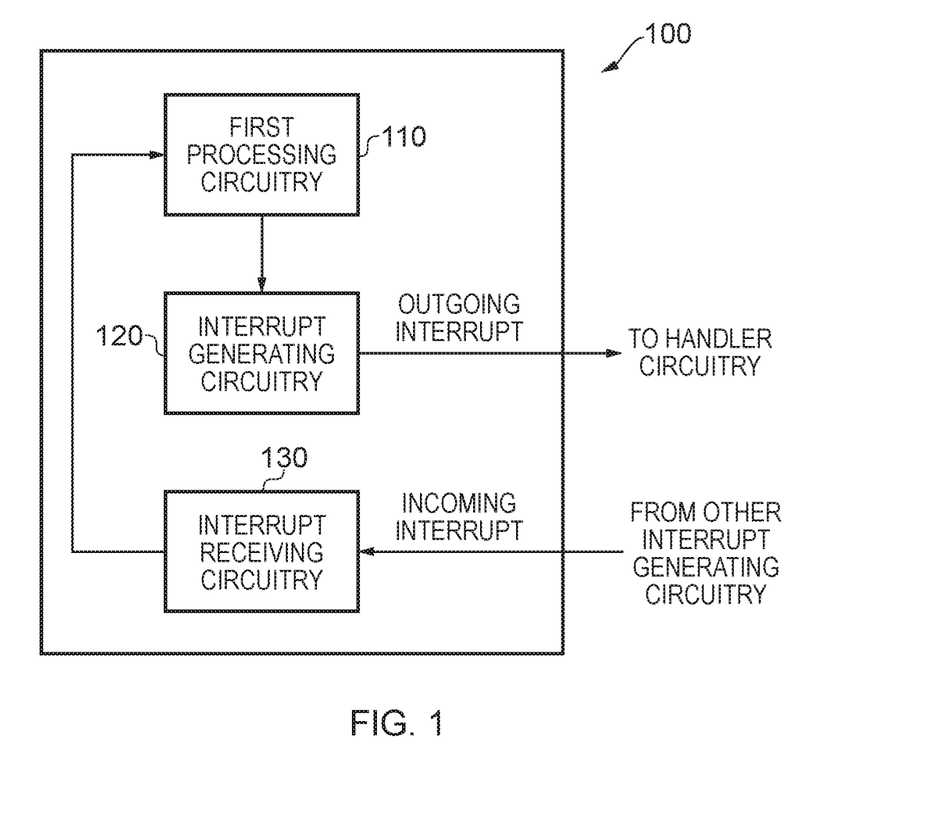
FIG. 1 illustrates a data processing apparatus in accordance with one embodiment.

FIG. 1 illustrates a data processing apparatus 100 in accordance with one embodiment. The data processing apparatus 100 includes first processing circuitry 110, such as a CPU, interrupt generating circuitry 120, and interrupt receiving circuitry 130. In this embodiment, the interrupt generating circuitry 120 detects when the first processing circuitry 110 becomes unresponsive, and thereby causes an interrupt to be generated. The interrupt is forwarded to handler processing circuitry (not shown in FIG. 1) on another (e.g. second) data processing apparatus. The interrupt receiving circuitry 130 receives an incoming interrupt from other interrupt generating circuitry on the second data processing apparatus. The interrupt indicates that second processing circuitry on the second data processing apparatus has become unresponsive. In this embodiment, the interrupt receiving circuitry 130 passes the interrupt, a reference to the interrupt, or details of the interrupt to the first processing circuitry 110 of the data processing apparatus 100 to make a response.

Note that in this embodiment, separate interrupt receiving circuitry 130 and interrupt generating circuitry 120 are provided. However, in other embodiments, either or both of these circuitries may form part of the first processing circuitry 110 itself, for either or both the data processing apparatus 100 and the second data processing apparatus.

Figure 2:
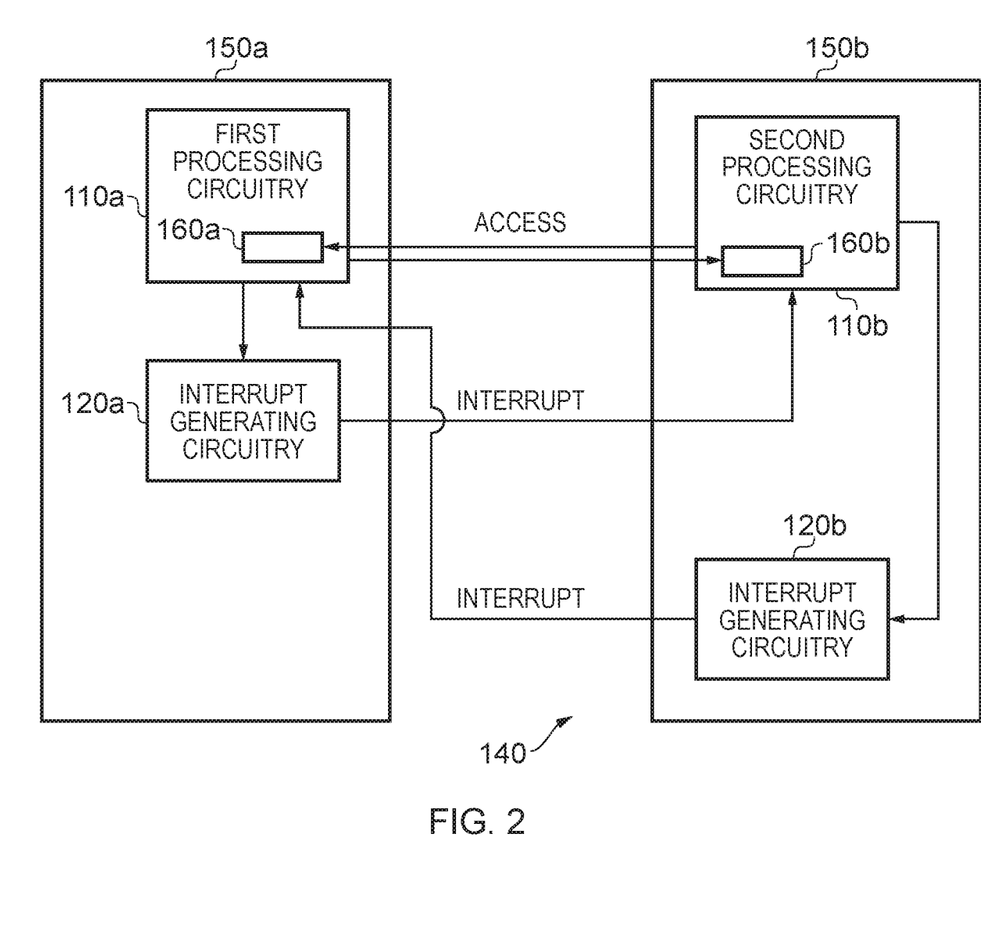
FIG. 2 illustrates an interaction with a data processing system between a first data processing apparatus and a second data processing apparatus in accordance with one embodiment.

FIG. 2 illustrates an interaction in a data processing system 140 between a first data processing apparatus 150a and a second data processing apparatus 150b in accordance with one embodiment. In this embodiment, as before, when first processing circuitry 110a becomes unresponsive, interrupt generating circuitry 120 generates an interrupt. This interrupt is then forwarded to second processing circuitry 160b of data processing apparatus 150b, which handles the interrupt. Similarly, if second processing circuitry 110b becomes unresponsive, then interrupt generating circuitry 120b generates an interrupt, which is forwarded to first processing circuitry 160a of the data processing apparatus 150a.

Each of the first processing circuitry 110a and the second processing circuitry 110b has local associated data storage 160a, 160b. The local associated data storage 160a, 160b could, for example, store state of the associated first or second processing circuitry 110a, 110b. For example, the data could comprise data stored in registers, memory or other processing elements that enable the first and second processing circuitry 110a, 110b to operate. In some embodiments, the data is information on which processing is to be performed. When the first processing circuitry 110a receives an interrupt to indicate that the second processing circuitry 110b has become unresponsive, the first processing circuitry 110a accesses the local associated data storage 160b of the second data processing apparatus 150b. Similarly, when second processing circuitry 110b receives an interrupt from the interrupt generating circuitry 120a of the first data processing apparatus 150a to indicate that the first processing circuitry 110a of the first data processing apparatus 150a has become unresponsive, the second processing circuitry 110b accesses the local data storage 160a associated with the first processing circuitry 110a in the first data processing apparatus 150a. The type of access may take a number of forms. For example, the access could involve reading and/or copying the data. This data could then be accessed by an analysis module in order to determine the particular situation that arose to cause the first processing circuitry 110a to become unresponsive. In some embodiments, the data could be restored or provided to a third processing circuitry for the processing task to be resumed. In some other embodiments, the data could be erased or written over, in order to provide security for the data.

Note that in other embodiments, the associated data storage 160a, 160b is not local to a data processing apparatus. For example, the associated data storage 160a could simply be managed by the first processing circuitry 110a without being local to the first data processing apparatus 150a. In some embodiments, there could be a single storage element that stores data for both the first and second data processing apparatuses 150a, 150b, with different data being managed by each of the processing circuitries 110a, 110b.

In some embodiments, the interrupt generated by the interrupt generating circuitry 120a in the first data processing apparatus 150a may initially be intended to be transmitted to circuitry other than the second processing circuitry 110b, with the interrupt being rerouted to the second processing circuitry 110b. Accordingly, there is no requirement that the interrupt is always destined for second processing circuitry 110b.

In this embodiment, the interrupt receiving circuitry 130a, 130b is considered to form a part of the first/second processing circuitry 110a, 110b. However, it will be appreciated that in other embodiments (e.g. as shown in FIG. 1) the interrupt receiving circuitry 130a, 130b can be a separate element. In some embodiments, the interrupt receiving circuitry 130a, 130b may be the first/second processing circuitry 110a, 110b itself, or the first/second processing circuitry 110a, 110b may form part of interrupt receiving circuitry 130a, 130b.

Figure 3:
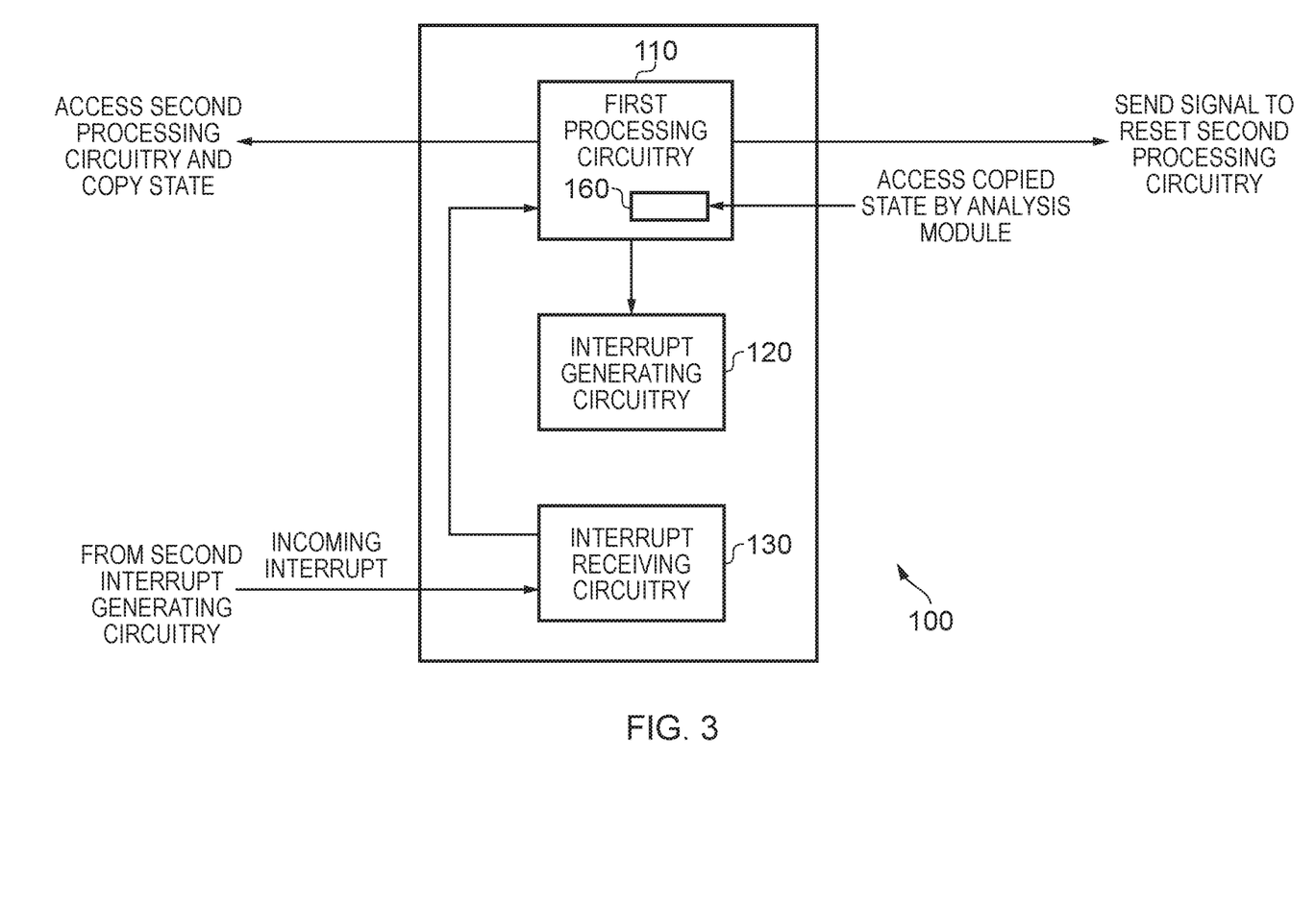
FIG. 3 illustrates a series of interactions performed by a data processing apparatus in accordance with one embodiment.

FIG. 3 illustrates a data processing apparatus 100 and its response to incoming interrupts. In this embodiment, as before, an incoming interrupt is received from interrupt generating circuitry of a second data processing apparatus by interrupt receiving circuitry 130, to indicate that a second processing circuitry has become unresponsive. The interrupt receiving circuitry 130 then forwards information relating to the interrupt to the first processing circuitry 110. The first processing circuitry 110 accesses data that is managed by the second processing circuitry. For example, the first processing circuitry 110 accesses state data relating to the unresponsive second processing circuitry and copies this state data to a local storage element 160. The first processing circuitry 110 then causes a signal to be sent to reset the second processing circuitry that has become unresponsive. This makes it possible for the second processing circuitry that has become unresponsive to take on further tasks and/or to resume work. In some instances, it may be possible for the unresponsive second processing circuitry, once reset, to resume execution from where it left off by restoring the state that has been saved in the local storage element 160.

Figure 4:
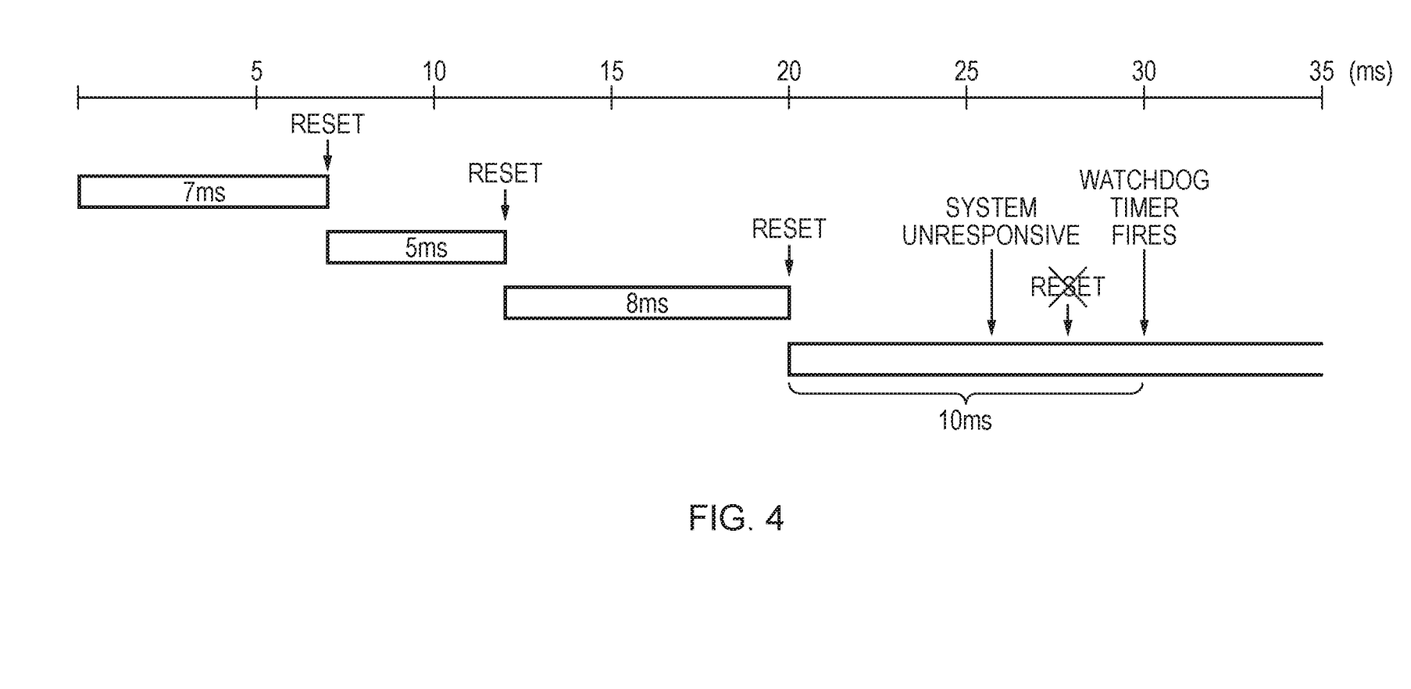
FIG. 4 illustrates the behaviour of a watchdog timer for determining whether a first processing circuitry has become unresponsive, in accordance with one embodiment.

FIG. 4 illustrates an example of operation of a watchdog timer in accordance with one embodiment. In this example, the watchdog timer acts as a mechanism for generating an interrupt to indicate that first processing circuitry has become unresponsive. In particular, the interrupt to indicate that the first processing circuitry has become unresponsive corresponds with an interrupt to indicate the firing of the watchdog timer. In FIG. 4, the watchdog timer is considered to last for 10 ms. When the watchdog timer fires, an interrupt is generated and this interrupt indicates that the first processing circuitry has become unresponsive. The first processing circuitry continually resets the watchdog timer (e.g. marked with the term "reset" in FIG. 4). The period with which the timer is reset is less than the length of the watchdog timer itself. For example, if the watchdog timer has a period x, then the watchdog timer is reset with period less than x. The consequence of this is that, provided the first processing circuitry remains active, it is able to continually reset the watchdog timer and so the watchdog timer will not fire. This is shown in FIG. 4. If the system becomes unresponsive (marked "system unresponsive" in FIG. 4) then the process for resetting the watchdog timer no longer occurs. Consequently, the watchdog timer will successfully count all the way down, and fire, thereby generating an interrupt. In other words, provided the first processing circuitry is active, the watchdog timer does not fire.

In other embodiments, other mechanisms for determining that the first processing circuitry has become unresponsive could be used. For example, a ping/response system could be used to require the first processing circuitry to respond to a query within a period of time. Failure to do so would indicate that the first processing circuitry was unresponsive. Other monitoring systems could also be used. Note that the determination that the first processing circuitry is unresponsive need not indicate that the first processing circuitry is permanently unresponsive or is unrecoverable. Instead, the interrupt merely indicates that a response was expected and not provided and that the first processing circuitry therefore might be malfunctioning.

Similarly, other ways of accessing the data managed by the unresponsive first processing circuitry could be employed as well or instead of those ways identified here. For instance, data managed by the unresponsive first processing circuitry could be deleted/erased/overwritten in order to maintain security, i.e. so that only the unresponsive first processing circuitry is able to access the data.

Figure 5:
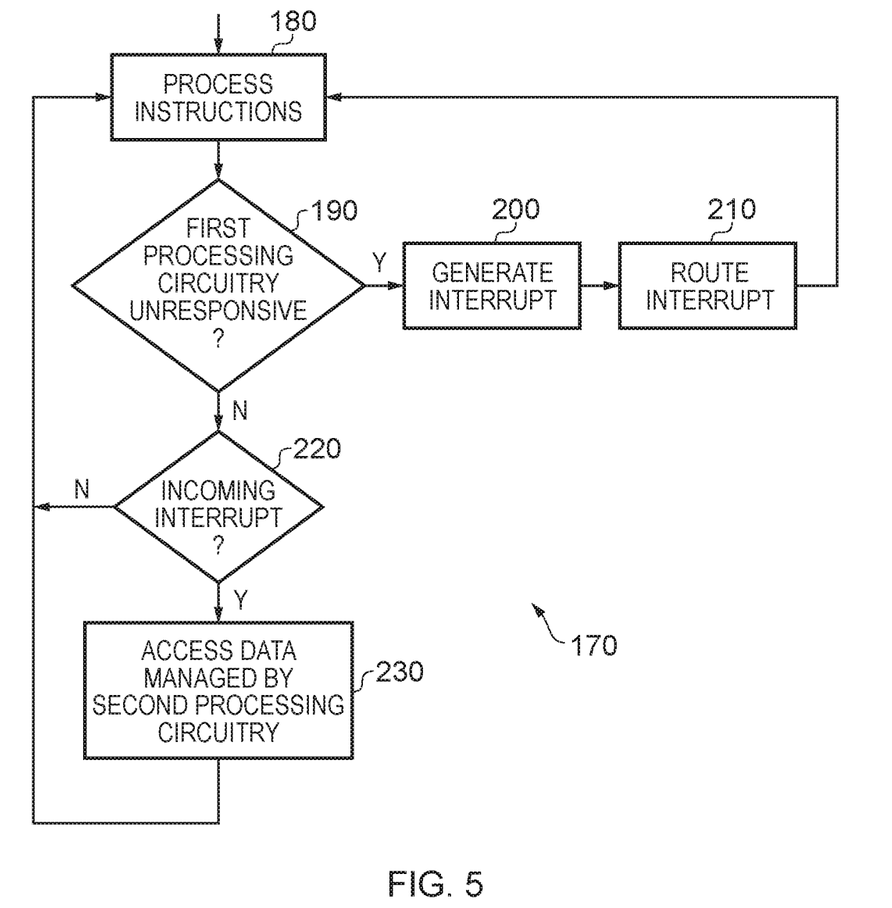
FIG. 5 illustrates a method of data processing in accordance with one embodiment.

FIG. 5 illustrates a flowchart 170 in accordance with one embodiment. This flowchart might, for example, represent the process performed by a first data processing apparatus. At a step 180, a next instruction or group of instructions are processed. At step 190, it is determined whether or not the first processing circuitry of the first data processing apparatus is unresponsive. If so, then at step 200, an interrupt is generated and the interrupt is routed to handling circuitry at step 210 (e.g. second processing circuitry or interrupt receiving circuitry of a second data processing apparatus). The process then returns to step 180 where a next instruction or group of instructions is processed. If the first processing circuitry is determined not to be unresponsive at step 190 (e.g. if it is responsive) then at step 220, it is determined whether or not there is an incoming interrupt that indicates that second processing circuitry is non-responsive. If not, the process proceeds to step 180 where a next instruction or group of instructions is processed. If so, then at step 230, the data managed by that second processing circuitry is accessed. The process then returns to step 180 where a next instruction or group of instructions is processed.

Note that the processes of detecting whether the first processing circuitry is unresponsive, for determining whether there is an incoming interrupt to indicate that second processing circuitry has become unresponsive, and the processing of instructions could all occur in parallel to one another in some embodiments.

Figure 6:
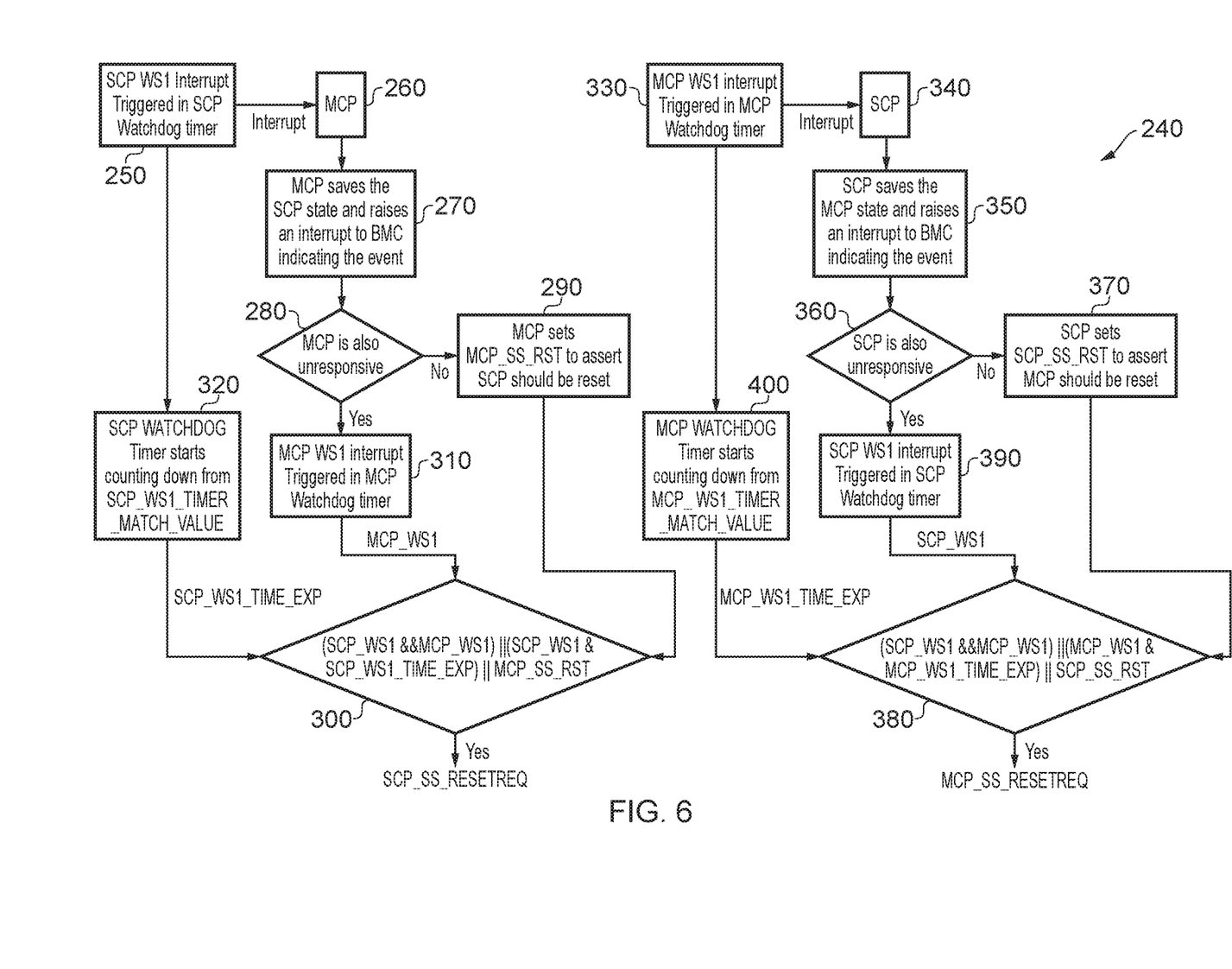
FIG. 6 illustrates a method of data processing in accordance with one embodiment.

FIG. 6 illustrates a method of data processing in accordance with one embodiment, as illustrated by a flowchart 240. In this embodiment, a first data processing apparatus takes the form of a System Control Processor (SCP) and a second data processing apparatus takes the form of a Manageability Control Processor (MCP). Each of these processors is assumed to be comprise interrupt generating circuitry and interrupt receiving circuitry, and all these circuits can be found in a single System-on-Chip (SoC) device. The process can begin at either of steps 250 or 330.

At step 250, the watchdog timer for the SCP fires, causing an SCP_WS1 interrupt to be generated. The interrupt is routed to the MCP in step 260. At a step 270, the MCP saves the state of the SCP and raises a further interrupt to a BaseBoard Management Controller (BMC), which can be outside of the SoC, to indicate what has occurred. At step 280 it is then determined whether or not the MCP is also unresponsive. If not, then at step 290 the MCP sets MCP_SS_RST to signal that the SCP should be reset. The process then proceeds to step 300. If, at step 280, it is determined that the MCP is unresponsive then at step 310, an MCP_WS1 interrupt is triggered and the process proceeds to step 300. Once the SCP_WS1 interrupt is generated at step 250, the process also proceeds to step 320. This step could occur in parallel or could occur in serial with step 260. In either case, at step 320, a new watchdog timer is started. This watchdog timer provides a predetermined period of time (SCP_WS1_TIMER_MATCH_VALUE) in which to resolve the firing of the main watchdog timer that fires at step 250. If this watchdog timer fires, then the process proceeds to step 300.

Step 300 represents a test in which it is determined whether or not the MCP has become unresponsive while handling the interrupt generated by the SCP or whether the MCP and SCP become unresponsive at the same time. The former of these is determined by the use of the second watchdog timer set up at step 320. In either of these events, an SCP_SS_RESETREQ signal is asserted to indicate that the entire subsystem (including the SCP and the MCP) should be reset.

Steps 330-400 correspond with steps 250-320 where the roles of the MCP and SCP are swapped. In particular, at step 330, the watchdog timer for the MCP fires, causing an MCP_WS1 interrupt to be generated. The interrupt is routed to the SCP in step 340. At step 350, the SCP saves the state of the MCP and raises a further interrupt to the BMC, to indicate what has occurred. At step 360 it is then determined whether or not the SCP is also unresponsive. If not, then at step 370 the SCP sets SCP_SS _RST to signal that the MCP should be reset. The process then proceeds at step 380. If, at step 360, it is determined that the SCP is unresponsive then at step 390, an SCP_WS1 interrupt is triggered and the process proceeds to step 380. Once the MCP_WS1 interrupt is generated at step 330, the process also proceeds to step 400. This step could occur in parallel or could occur in serial with step 260. In either case, at step 400, a new watchdog timer is started. This watchdog timer provides a predetermined period of time (MCP_WS1_TIMER_MATCH_VALUE) in which to resolve the firing of the main watchdog timer that fires in step 330. If this watchdog timer fires, then the process proceeds to step 380.

Step 380 represents a test in which it is determined whether or not the SCP has become unresponsive while handling the interrupt generated by the MCP or whether the MCP and SCP become unresponsive at the same time. The former of these is determined by the user of the second watchdog timer set up at step 400. In either of these events, an MCP_SS_'RESETREQ signal is asserted to indicate that the entire subsystem (including the SCP and MCP) should be reset).

The above configurations make it possible to react to a second processing circuitry becoming unresponsive in such a manner that it is possible to obtain data managed by the second processing circuitry such as state information relating to the second processing circuitry. This makes it possible to analyse the actual state information that caused the second processing circuitry to become unresponsive. Furthermore, this can be achieved without necessarily outputting large amounts of trace data, since only the actual state information that caused the unresponsiveness is output and this output only occurs in response to the second processing circuitry becoming unresponsive. Other actions to the second processing circuitry becoming unresponsive are also possible, such as erasing or overwriting the data managed by the second processing circuitry in order to enable security.

In the present application, the words "configured to . . . " are used to mean that an element of an apparatus has a configuration able to carry out the defined operation.

In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   first processing circuitry;
   interrupt generating circuitry configured to generate an outgoing interrupt and to transmit said outgoing interrupt outside said data processing apparatus, in response to said first processing circuitry becoming unresponsive; and
   interrupt receiving circuitry configured to receive an incoming interrupt from outside said data processing apparatus, which indicates that second processing circuitry has become unresponsive, and in response to receiving said incoming interrupt, to cause said data processing apparatus to copy an architectural state of said second processing circuitry generated by said second processing circuitry as a result of executing a stream of instructions and used to execute said stream of instructions, to produce a copied architectural state of said second processing circuitry used to execute said stream of instructions, wherein
   said interrupt receiving circuitry is configured to make said copied architectural state of said second processing circuitry available to third processing circuitry and to cause said third processing circuitry to resume execution of said stream of instructions using said copied architectural state of said second processing circuitry.

2. A data processing apparatus according to claim 1, wherein
   said interrupt receiving circuitry is configured to cause said data processing apparatus to overwrite said architectural state of said second processing circuitry.

3. A data processing apparatus according to claim 1, wherein
   in response to receiving said incoming interrupt, said interrupt receiving circuitry is further configured, after said data processing apparatus has copied said architectural state of said second processing circuitry, to cause said second processing circuitry to be reset.

4. A data processing apparatus according to claim 1, wherein
   said interrupt generating circuitry is configured to determine that said first processing circuitry has become unresponsive by expiration of a watchdog timer.

5. A data processing apparatus according to claim 1, wherein
   in response to said interrupt receiving circuitry receiving said incoming interrupt and said first processing circuitry becoming unresponsive, said data processing apparatus is configured to cause said first processing circuitry and said second processing circuitry to be reset.

6. A data processing apparatus according to claim 1, wherein
   said interrupt generating circuitry is configured to route said outgoing interrupt to handler processing circuitry; and
   said handler processing circuitry comprises or is comprised by said second processing circuitry.

7. A data processing apparatus according to claim 1, wherein
   said interrupt generating circuitry is configured to route said outgoing interrupt to handler processing circuitry;
   said data processing apparatus is a system control processor; and
   said handler processing circuitry is a manageability control processor.

8. A data processing apparatus according to claim 1, wherein
   said interrupt generating circuitry is configured to route said outgoing interrupt to handler processing circuitry;
   said data processing apparatus is a manageability control processor; and
   said handler processing circuitry is a system control processor.

9. A data processing apparatus according to claim 1, wherein
   said interrupt generating circuitry is configured to route said outgoing interrupt to handler processing circuitry; and
   said handler processing circuitry is different to said first processing circuitry.

10. A method of operating a data processing apparatus, said method comprising:
    processing one or more instructions on processing circuitry;
    generating, by interrupt generating circuitry, an outgoing interrupt and transmitting said outgoing interrupt outside said data processing apparatus in response to first processing circuitry becoming unresponsive;
    receiving, at interrupt receiving circuitry, an incoming interrupt from outside said data processing apparatus, which indicates that second processing circuitry has become unresponsive; and
    causing said data processing apparatus, in response to receiving said incoming interrupt at said interrupt receiving circuitry, to copy an architectural state of said second processing circuitry generated by said second processing circuitry as a result of executing a stream of instructions and used to execute said stream of instructions, to produce a copied architectural state of said second processing circuitry used to execute said stream of instructions;
    making said copied architectural state of said second processing circuitry available to third processing circuitry; and
    causing said third processing circuitry to resume execution of said stream of instructions using said copied architectural state of said second processing circuitry.

11. A data processing system comprising:
a plurality of data processing apparatuses, each data processing apparatus in said plurality of data processing apparatuses comprising:
first processing circuitry;
interrupt generating circuitry configured to generate an outgoing interrupt and to transmit said outgoing interrupt outside said data processing apparatus in response to said first processing circuitry becoming unresponsive; and
interrupt receiving circuitry configured to receive an incoming interrupt from outside said data processing apparatus, which indicates that second processing circuitry on an other one of said plurality of data processing apparatuses has become unresponsive, and in response to receiving said incoming interrupt, to cause said data processing apparatus to copy an architectural state of said other one of said plurality of data processing apparatuses generated by said other one of said plurality of data processing apparatuses as a result of executing a stream of instructions and used to execute said stream of instructions, to produce a copied architectural state of said other one of said plurality of data processing apparatuses used to execute said stream of instructions, wherein
said interrupt receiving circuitry is configured to make said copied architectural state of said other one of said plurality of data processing apparatuses available to third processing circuitry and to cause said third processing circuitry to resume execution of said stream of instructions using said copied architectural state of said other one of said plurality of data processing apparatuses.

* * * * *